C. E. Hunter,
Straightening Bolts.
No. 111,941. Patented Feb. 21, 1871.

Witnesses:
John Becker.
L. S. Mabee

Inventor:
C. E. Hunter
per Munn & Co.
Attorneys.

United States Patent Office.

CHARLES E. HUNTER, OF HINSDALE, NEW HAMPSHIRE.

Letters Patent No. 111,941, dated February 21, 1871.

IMPROVEMENT IN MACHINES FOR STRAIGHTENING BOLTS.

The Schedule referred to in these Letters Patent and making part of the same.

*To all whom it may concern:*

Be it known that I, CHARLES E. HUNTER, of Hinsdale, in the county of Cheshire and State of New Hampshire, have invented a new and improved Bolt-Straightening Apparatus; and I do hereby declare that the following is a full, clear, and exact description thereof, which will enable others skilled in the art to make and use the same, reference being had to the accompanying drawing forming part of this specification.

This invention relates to improvements in apparatus for straightening bolts; and It consists in a combination of a shank-holding attachment and clamping and holding devices therefor with a metal block or "sow," so called, preferably of iron, having grooves of different sizes in or across the face, corresponding in form and size to the heads of the bolts to be straightened, with which the said shank-holding attachment is so arranged that the shank of the bolt may be placed in it and the head in the groove in the block, and so supported that the bolt may be readily straightened at the juncture of the shank with the head by the head and shank brought into the same axis by blows of a hammer delivered on the shank or head.

Figure 1:
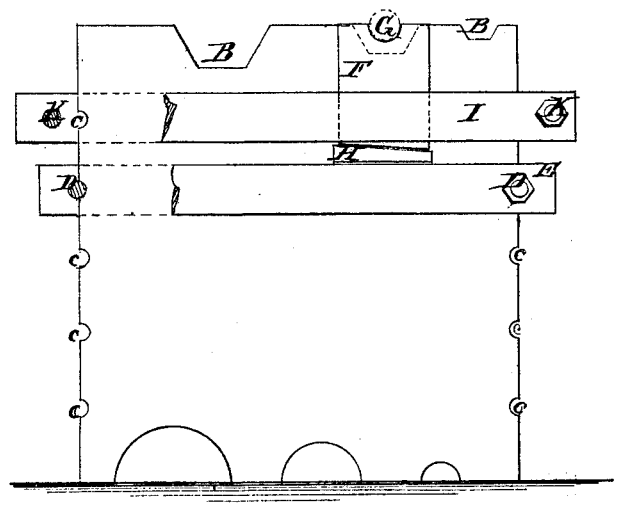
Figure 2:
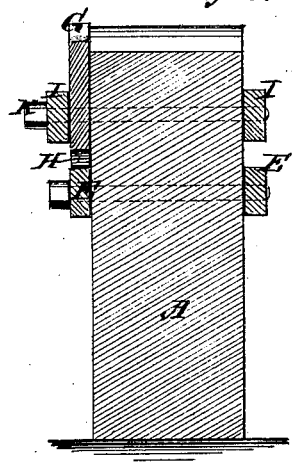

Figure 1 is a side elevation of the apparatus, with the clamping apparatus sectioned, and Figure 2 is a vertical section.

Similar letters of reference indicate corresponding parts.

A is the metal block or "sow," having one or more grooves, B, in its upper face, corresponding in shape and size to the heads of the bolts to be straightened. It is provided with the transverse grooves C in the vertical end walls, for the connecting-bolts D of the bars E, one of which is clamped against each of the sides, between which the grooves B run.

F is the shank-holding attachment, consisting of a flat piece of steel of suitable form and dimensions, having a groove in the upper end suited for the shank of the bolt to lie in. It is placed against the side of the block, with its groove coinciding axially with the groove B of the block A, in which the bolt to be trued is to be placed and supported above one of the bars E by an adjusting-key, H, resting on said bar; and it is firmly clamped against the said side by the clamping-bars I and bolts K, as clearly shown.

The bolt L to be trued is laid on the groove B, and the shank in the groove G, with the high or concave side up, and struck with a hammer till brought to the right line.

The block A may have any suitable number of these grooves in each end of different sizes and shapes, and a shank-holding plate, F, may be provided for each groove B, with a groove corresponding to the size of the shank of the bolt for which the groove B is intended.

The bars E may be supported at different distances from the ends of the block A, according to the required lengths of the plates F.

The adjusting-key need not be necessarily used, if the bars E are placed at the right height and the plates F made in suitable lengths.

The attachment may be applied to the anvil of any trip-hammer or drop, and used for straightening tools or other articles, the grooves on the plate F and anvil being suited in shape and size to the said tool or other articles to be treated; and I propose to make such application of it.

Having thus described my invention,

I claim as new and desire to secure by Letters Patent—

1. The combination, with the block or "sow" A, having the grooves B and C, of the shank-holding plate F, bars E I, and their clamping-bolts, all substantially as specified.

2. The combination, with the above, of the adjusting-key H, substantially as specified.

CHARLES E. HUNTER.

Witnesses:
HENRY E. HUNTER,
WARREN S. BARROWS.